Patented July 25, 1944

2,354,211

UNITED STATES PATENT OFFICE 2,354,211

INSULIN PREPARATION

Everett H. Lang, Tuckahoe, and Johannes S. Buck, Bronxville, N. Y., assignors to Burroughs Wellcome & Co. (U. S. A.) Inc., New York, N. Y., a corporation of New York No Drawing. Application July 2, 1940, Serial No. 343,556

8 Claims. (Cl. 167—75)

This invention relates to an insulin preparation and has for an object to provide a preparation of the above type which when administered subcutaneously or intramuscularly, will produce a reduction in the blood sugar level lasting for a longer period of time than would a similar injection of insulin alone.

Various other objects and advantages will be apparent as the nature of the invention is more fully disclosed.

Although the novel features which are believed to be characteristic of this invention are pointed out more particularly in the claims appended hereto, the invention may be better understood by referring to the following description in which a specific embodiment thereof has been set forth for purposes of illustration.

In the following description and in the claims certain specific terms have been used for convenience in referring to various details of the invention. These terms, however, are to be given as broad as interpretation as the state of the art will permit.

In accordance with the present invention we have discovered that many primary, secondary and tertiary alkoxyphenethylamines and their salts and alkoxyphenethyl quaternary ammonium salts, when reacted with formaldehyde or with a substance capable of depolymerizing into formaldehyde, such for example as a paraformaldehyde and other polyoxymethylenes, or a substance capable of being broken up into formaldehyde and one or more other substances such for example as halomethanols, methylal, methylene diacetate and chloromethylether, hereinafter referred to for convenience as formaldehyde substances, give rise to products which are capable of shifting the isoelectric precipitation zone of insulin and as a result of this may form a precipitate with insulin at a pH value of about 7.0, that is, between pH 6.0 and pH 8.0.

Some of the amine-formaldehyde substance reaction products produce only slight prolongation of insulin action while others extend the duration more than 24 hours. Intermediate prolongation of activity may be achieved by suitably selecting an amine-formaldehyde substance reaction product and also by varying the amounts used.

The conditions of reaction vary according to the amines or quaternary ammonium compounds used. The reaction is usually carried out in the presence of a suitable diluent or solvent and of an agent capable of causing condensation.

The following examples will illustrate the character of the process.

Example 1

To 12.4 gm. p-methoxyphenethylmethylamine is added 15 cc. water and the whole chilled in ice. To the mixture is added, in small portions, with agitation and chilling in ice, a cold solution of 5.85 cc. 36% formaldehyde solution in 15 cc. water. When all has been added, 30 cc. concentrated hydrochloric acid is gradually added, the whole being chilled in ice during the addition. The flask is loosely closed with a watch-glass and heated on the steam bath for four hours. The resulting solution is evaporated to dryness under reduced pressure on the steam bath and the residue dissolved in absolute alcohol and precipitated by the addition of ethyl acetate and absolute ether. The precipitate (condensation product), usually granular, is filtered off, washed with absolute ether, and dried in vacuo.

Example 2

2.00 gm. m-methoxyphenethyldimethylamine is dissolved in 4 cc. water and 6 cc. concentrated hydrochloric acid and 1.73 cc. 36% formaldehyde solution added. After sealing the whole in a glass tube, the tube is heated in boiling water for about 7 hours. A pale yellow liquid is formed and this is evaporated to dryness in vacuo. The residue is dissolved in absolute alcohol and absolute ether added. A gum separates and on trituration with fresh ether forms a white powder. The powder (condensation product) is filtered off and dried in vacuo.

Example 3

3.8 gm. p-methoxyphenethyltrimethylammonium chloride is dissolved in 7 cc. water and 10.5 cc. concentrated hydrochloric acid. To the solution is added 2.6 cc. 36% formaldehyde solution and the whole is then sealed in a glass tube. After heating the tube in boiling water for 8 hours, it is allowed to cool and is opened. Some gas usually escapes. The solution is evaporated to dryness under reduced pressure on the steam bath and the residue taken up in absolute alcohol, and again evaporated as before. The residual material is dissolved in absolute alcohol and ether added. The mass so formed is triturated with absolute ether and the granular powder (condensation product) produced is filtered off and dried in vacuo.

The examples given are merely illustrative and are not to be taken as delimiting the invention. The precipitating agent may be obtained in a dry state by suitable manipulation, such as evaporation in vacuo, or precipitation by suitable liquids in which it is relatively insoluble, or it may be used in the solution in which it was formed, provided that the pH be properly adjusted.

Insulin of any type may be used and the proportion of precipitating agent used as solid, or emulsion, or as solid dissolved in a solvent, for example water, or as the solution, may vary widely. The mixing of the components may be done in any desired way.

In order to prolong greatly the insulin effect we prefer that the amount of the reaction product be at least sufficient to produce precipitation of the insulin at pH between 6.0 and 8.0.

The product formed may be modified or varied by the addition of metals, either as the metal itself or preferably as a salt. Among the suitable metals are zinc, cadmium, calcium, aluminum, iron, nickel, cobalt and copper. The presence of a metal, especially zinc, is desirable, although in no way essential.

Example 4

To 14 cc. of a commercial insulin solution, containing 130 units of insulin per cc., there is added 0.51 cc. of a zinc chloride solution containing 10.74 mgm. of zinc per cc. To 1 cc. of this insulin and zinc solution, there is added 1.25 mgm. of p-methoxyphenethylmethylamine-formaldehyde reaction product, prepared as described above, dissolved in 0.125 cc. of water, and also 0.445 cc. of a buffer mixture made by adding 1 cc. of 0.106 N NaOH to 3.5 cc. of 0.11 M $Na_2HPO_4$. The mixture now contains 0.8 mgm. of the condensation product and 0.24 mgm. of zinc and 80 units of insulin per cc. and is buffered at a pH of about 7.4.

Example 5

A. To 3 cc. of a commercial insulin solution containing 130 units of insulin per cc., there is added 0.11 cc. of a zinc chloride solution containing 10.74 mgm. of zinc per cc. and 0.39 cc. of an aqueous solution containing 3.9 mgm. of m-methoxyphenethyldimethylamine - formaldehyde reaction product prepared as described above. To this is added 1.375 cc. of 0.7% tricresol solution. The clear solution now contains 0.8 mgm. of the condensation product and 0.24 mgm. of zinc and 80 units of insulin per cc., and also 0.2% tricresol as preservative.

B. To 9 cc. of a commercial insulin solution containing 130 units of insulin per cc. there is added 0.327 cc. of a zinc chloride solution containing 10.74 mgm. of zinc per cc. To 3 cc. of this insulin and zinc solution there is added 7.54 mgm. of m-methoxyphenethyldimethylamine-formaldehyde reaction product, prepared as described above, dissolved in 0.377 cc. of water, and also 1.33 cc. of a tricresol buffer mixture made by dissolving 0.07 cc. of tricresol in a mixture of 2 cc. of 0.106 N NaOH and 8 cc. of 0.11 M $Na_2HPO_4$. The mixture now contains 1.6 mgm. of the condensation product and 0.24 mgm. of zinc and 80 units of insulin per cc., and is buffered at a pH of about 7.4, and contains about 0.2% tricresol as a preservative.

Example 6

To 1 cc. of a commercial insulin solution containing 130 units of insulin per cc. there is added 0.13 cc. of an aqueous solution containing 1.3 mgm. of p-methoxyphenethyltrimethylammonium chloride-formaldehyde reaction product prepared as described above. To this is added 0.5 cc. of a buffer mixture containing 9 parts of 0.11 M $Na_2HPO_4$ and 1 part of 0.11 M $KH_2PO_4$. The mixture now contains 0.8 mgm. of the condensation product and 80 units of insulin per cc. and is buffered at a pH of about 7.1.

The insulin, modified as described, may be administered in water, either subcutaneously or intramuscularly, with or without a metal present. According to the pH, conveniently controlled by the addition of a buffering agent, the preparation will be a suspension (e. g., at pH 6.0–8.0) or a solution (at a pH less than 4.0).

The preparation is very effective in prolonging the insulin effect.

A disinfectant or preservative may be added to the preparations if desired.

Although certain specific embodiments of the invention have been described for the purposes of illustration, it is to be understood that the invention is capable of various uses and that changes and modifications may be made therein as will readily appear to a person skilled in the art. The invention is only to be limited in accordance with the scope of the following claims.

What is claimed is:

1. The process of preparing an insulin preparation having a prolonged effect which comprises condensing under acid conditions a formaldehyde substance with a substance selected from the group consisting of alkoxyphenethylamines and their salts and alkoxyphenethylamines quaternary ammonium derivatives, to produce a reaction product which is capable of forming a precipitate with insulin at a pH value of between 6.0 and 8.0 and incorporating insulin with said product.

2. The method set forth in claim 1 further characterized by adding a buffering agent to adjust the pH value so as to obtain the desired product.

3. An insulin preparation comprising insulin and a condensation product of a formaldehyde substance and a substance selected from the group consisting of alkoxyphenethylamines and their salts and alkoxyphenethyl quaternary ammonium derivatives, said product having the property of precipitating insulin at a pH value between 6.0 and 8.0.

4. The product set forth in claim 3 having a buffering agent incorporated therewith to control the pH value.

5. The product of claim 3 having incorporated therewith a substance selected from the group consisting of zinc, cadmium, calcium, aluminum, iron, nickel, cobalt, copper and salts thereof.

6. The product of claim 3 having incorporated therewith a substance selected from the group consisting of zinc, cadmium, calcium, aluminum, iron, nickel, cobalt, copper and salts thereof, and having a buffering agent incorporated therewith to control the pH value.

7. An insulin preparation comprising insulin and a reaction product of m-methoxyphenethyldimethylamine and formaldehyde.

8. An insulin preparation comprising insulin and a reaction product of m-methoxyphenethyldimethylamine and formaldehyde, with the addition of a substance selected from the group consisting of zinc and zinc salts.

EVERETT H. LANG.
JOHANNES S. BUCK.